UNITED STATES PATENT OFFICE.

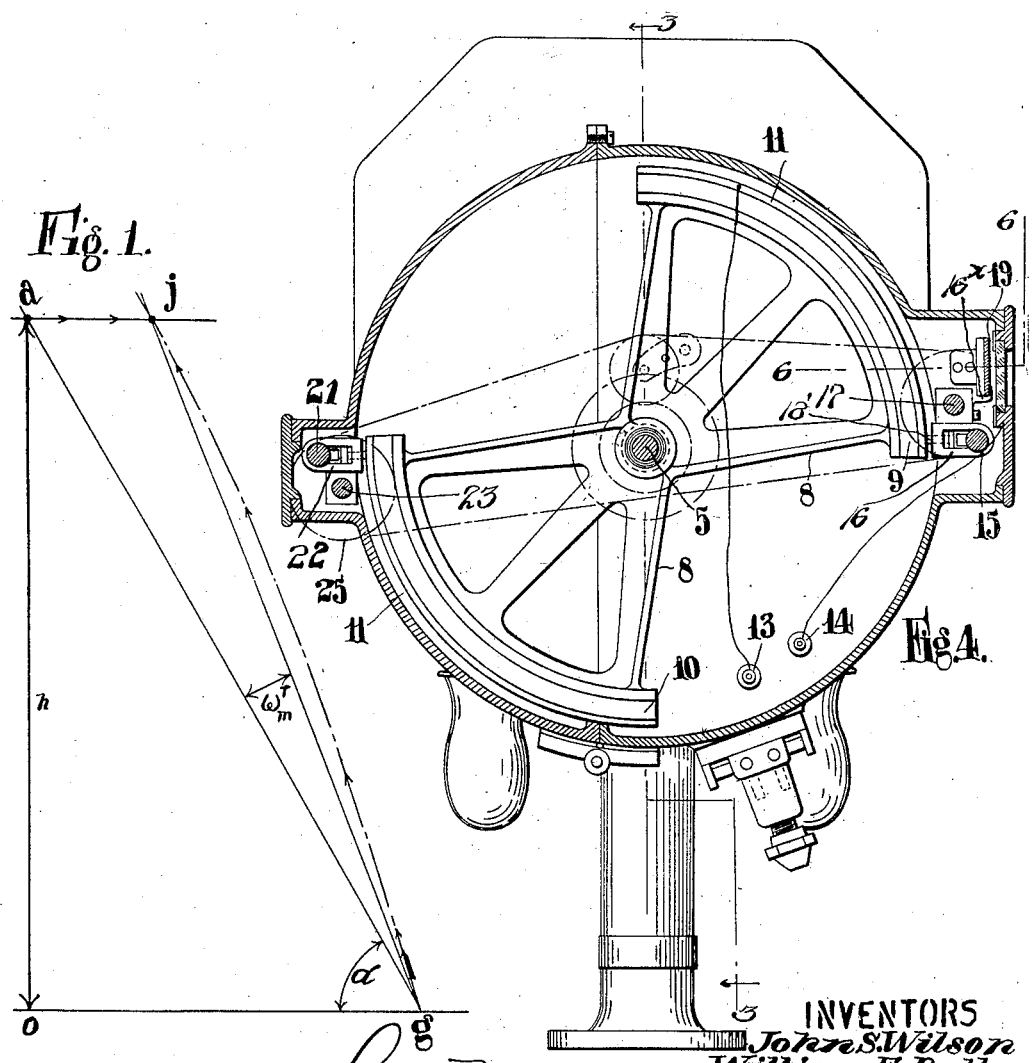

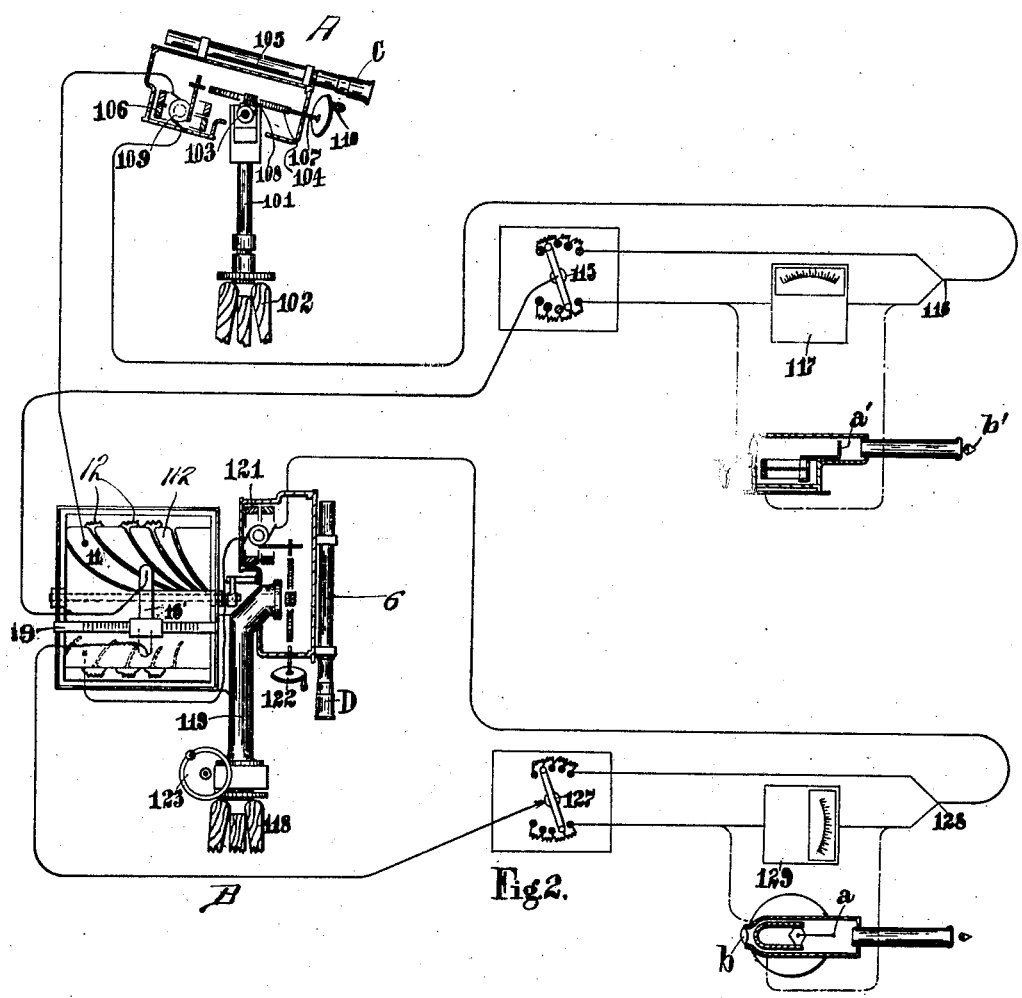

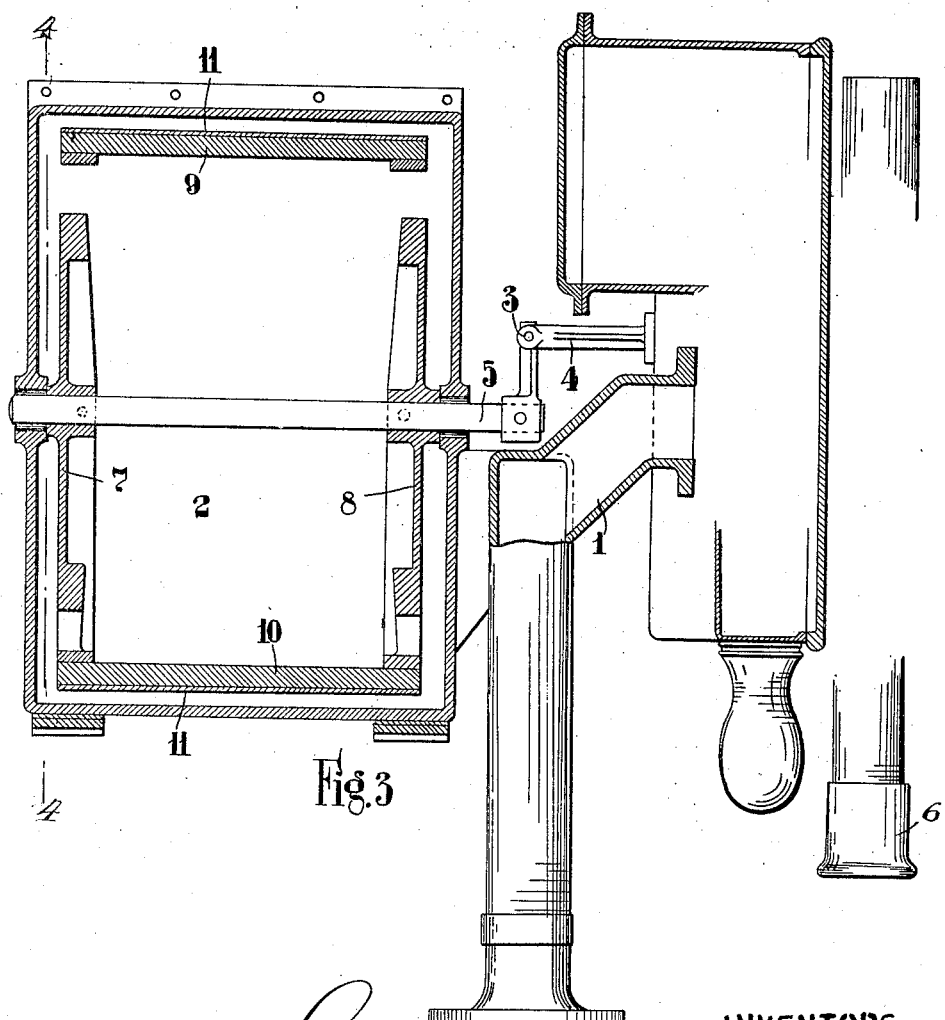

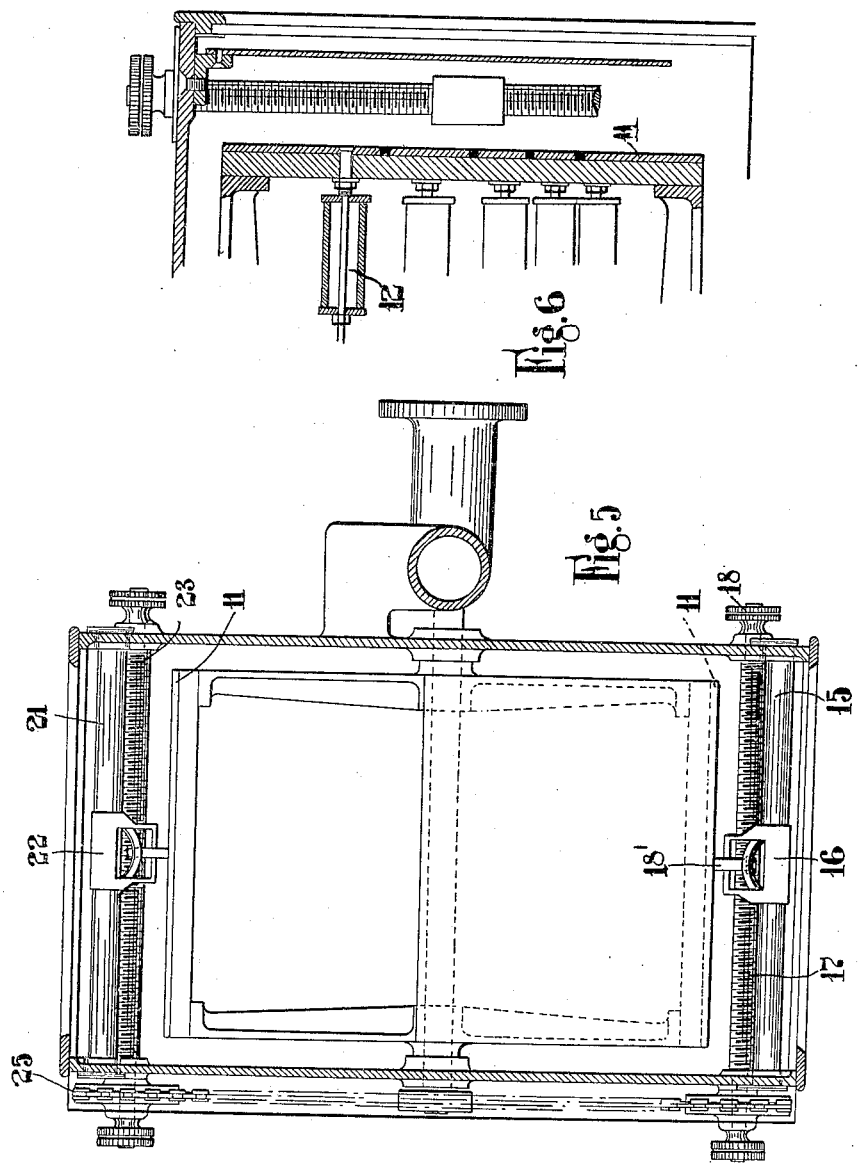

JOHN SIGISMUND WILSON, OF WESTMINSTER, LONDON, AND WILLIAM ERNEST DALBY, OF EALING, LONDON, ENGLAND, ASSIGNORS OF ONE-THIRD TO SIR W. G. ARMSTRONG-WHITWORTH AND COMPANY LIMITED, OF NEWCASTLE-UPON-TYNE, ENGLAND.

APPARATUS FOR DIRECTING ARTILLERY FIRE ON MOVING OBJECTS.

1,322,154.      Specification of Letters Patent.      Patented Nov. 18, 1919.

Application filed August 7, 1917. Serial No. 184,981.

*To all whom it may concern:*

Be it known that we, JOHN SIGISMUND WILSON, a subject of the King of Great Britain and Ireland, and residing at 29 Denbigh street, Westminster, London, S. W. 1, England, and WILLIAM ERNEST DALBY, a subject of the King of Great Britain and Ireland, and residing at 37 Madeley road, Ealing, London, W. 5, England, have invented a certain new and useful Improved Apparatus for Directing Artillery Fire on Moving Objects, of which the following is a specification.

The present invention relates to an improved apparatus for directing artillery fire on moving objects and is especially applicable to anti-aircraft guns.

In Letters Patent of the United States granted to us January 1st, 1918, No. 1252379, we have described apparatus for measuring angular velocity of a line of sight in the plane of altitude and in the vertical plane passing through the line of sight, and in the United States specification No. 184980 we have described apparatus in which the movement of the line of sight is transmitted to a dynamo or magneto machine adapted to give a current substantially proportional to the angular velocity of the line of sight.

The present invention consists in providing means by which the resistance in the electric circuit is varied by an observer according to the height of the target while the resistance is altered automatically according to the angle of sight so that the total resistance in the circuit corresponds with the time of flight.

The invention further consists in combining with a director for determining the deflection, in the plane of altitude or in the vertical plane an automatic selector by which the resistance is varied according to the angle of sight in the vertical plane, and according to the height of the target otherwise observed, in combination with an indicating device indicating the deflection, or an automatically moved element of the sights on the gun.

The invention further consists in the improvements in apparatus for sighting guns on moving targets hereinafter described.

In carrying the invention into effect according to one example for determining the correction for deflection in the plane of altitude, we provide an instrument of the type described in the Letters Patent of the United States granted to us January 1st, 1918, No. 1252379, but arranged so that the rotation of the first motion shaft drives a dynamo or magneto machine producing a current proportional to the angular velocity of the line of sight in the plane of altitude. The current produced passes through a circuit containing a rheostat and an indicating device with a scale marked with corrections of deflection to be applied to the gun sights.

The resistance in the rheostat is variable in two ways, firstly, the contacts are so arranged that the resistance is varied by the movement of a second line of sight in a second instrument used to follow the target in the vertical plane. The resistance is also varied by a device which is set by hand according to the height of the target which is otherwise observed. The resistance, therefore, will depend on the inclination of the line of sight to the horizontal and on the height of the target which has been determined by any suitable means.

It will be seen, therefore, that the rheostat for correcting the deflection may conveniently be combined with the director used for determining the correction of tangent elevation.

Referring to the accompanying drawings:—

Figure 1 is a diagram showing the path of an airship and the projectile fired at.

Fig. 2 is a diagrammatic view of apparatus according to our invention.

Fig. 3 is a sectional view of a director having attached thereto a variable resistance selector according to the invention. The section being on line 3—3 of Fig. 4 and some of the parts being shown in elevation.

Fig. 4 is a part sectional view looking from the left hand side on the line 4—4, Fig. 3.

Fig. 5 is a sectional plan view of the casing of the instrument shown in Figs. 3 and 4, but showing the interior parts in plan view.

Fig. 6 is a sectional view on line 6—6 of Fig. 4 showing the method of arrangement of the resistances.

Figure 7:
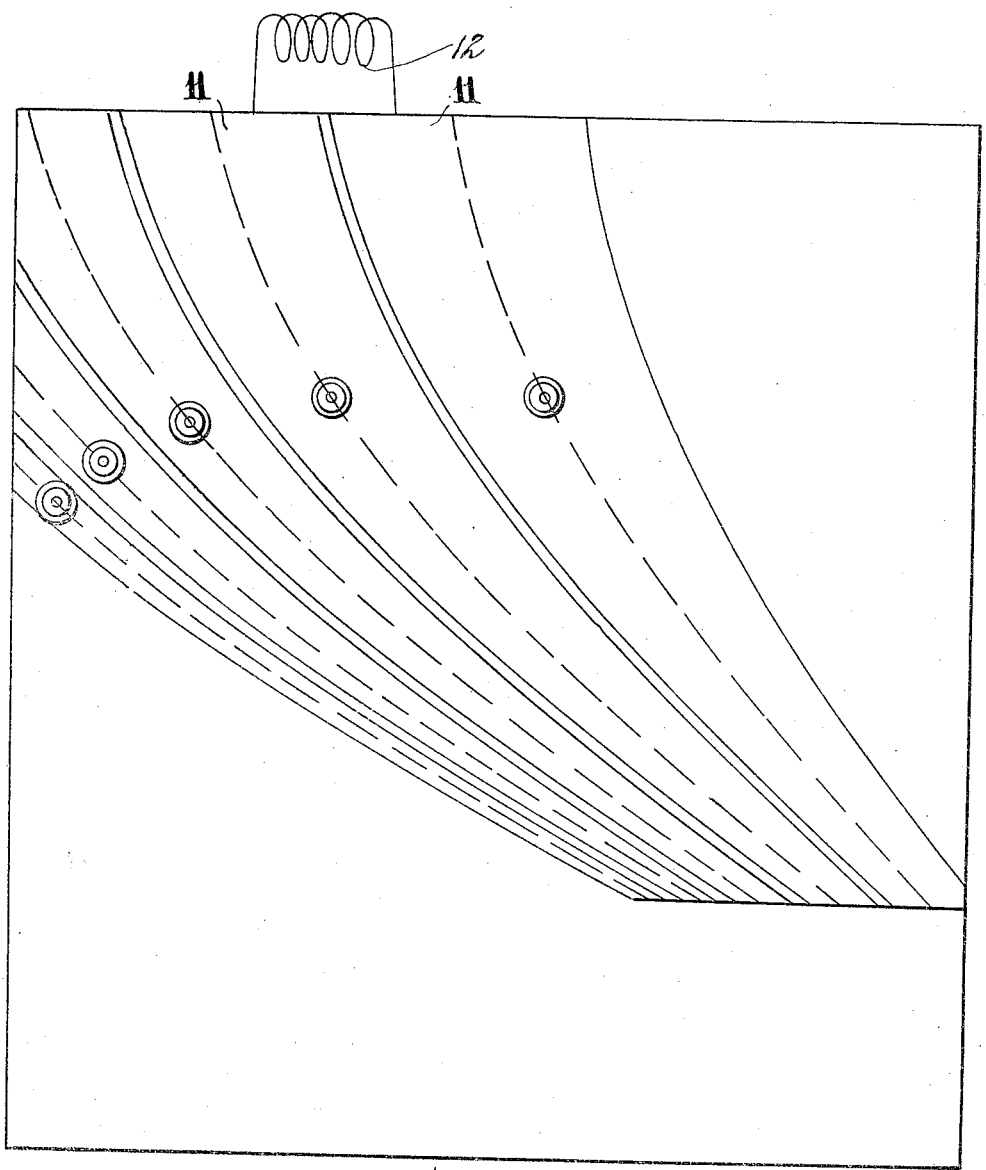
Fig. 7 is a full-size development of the resistance strips.

In the diagram shown in Fig. 1, $a$ is supposed to be the position of an aircraft traveling along the arrows in the direction $a$—$j$, and $g$ the position of the gun aimed at this aircraft. The line $g$—$o$ represents the ground level. The shot is supposed to leave the gun at $g$ when the aircraft is at $a$ and the shot is to strike the aircraft at the point $j$.

It will be seen that if the shot is to strike the aircraft the time taken by the aircraft to move from $a$ to the junction $j$ must be equal to the time taken by the shot to move from the gun $g$ to the point of junction $j$.

Let $\omega m$ be the mean angular velocity of the line $g$—$a$ in the plane of the paper, the aircraft being assumed to move along the line $a$—$j$ also in the plane of the paper. Let T be the time taken by the shot to move from $g$ to $j$. Then the angular distance of the point $j$ from the point $a$ must be the angle $\omega m$T. In order to lay the gun the position in space of the junction $j$ must be known and this can only be inferred from observations made on the aircraft when passing through the point $a$. Let $t$ be the time of flight of the projectile from $g$ to $a$ deduced from observations made on the range $g$ $a$ and the angle of sight $\alpha$ between the line of sight $g$ $a$ and ground line $g$ $o$, or from observations of the height $h$, $a$ $o$ and the angle of sight $\alpha$. The angular velocity $\omega$ of the aircraft with reference to the gun position may be observed as it passes through the point $a$ by a director constructed as described in our United States Patent specification No. 1252379. The product $\omega t$ then gives approximately the angular distance of the line joining the gun to the junction $j$ measured from the line joining the gun to the aircraft, so far as this can be obtained from observations taken when the aircraft is at the point $a$.

It will be seen that the true angular distance of the line joining the gun to the junction $j$ measured from the line joining the gun to the point $a$ is $\omega m x$T, but as the observation has to be made when the aircraft is at $a$ the quantity $\omega m$, the mean angular velocity between $a$ and $j$, is unknown.

We may, however, without great error, assume $\omega t = \omega m$T. This is not very greatly in error since when the aircraft is flying along an approximately horizontal path toward the gun, $\omega m$ is greater than $\omega$ and T is less than $t$, while when the aircraft is flying in the opposite direction, that is to say, away from the gun, $\omega m$ is less than $\omega$ and T is greater than $t$, so that the product $\omega t$ in neither case differs very much from the product $\omega m$T.

In practice the height of the aircraft is the element of its position which varies least, and it may be taken that the height of the junction $j$ is approximately the same as the height $h$ at $a$, but the angular position of the junction is equal to the angle of sight $\alpha$ plus the deflection angle, whose true value is $\omega m$T but which has been taken as $\omega t$. From the height and the known angle $\alpha + \omega t$, or $\alpha - \omega t$, according as the aircraft is flying toward or away from the gun, the range can be calculated, and hence the time of flight and fuse time can be determined from a table giving the known ballistics of the gun.

In carrying the invention into effect, see Fig. 2, we provide two instruments A and B, one having a line of sight (in the case illustrated a telescope C) with cross wires adapted to follow the target in the plane of altitude, the other B having a line of sight (as illustrated a telescope D) adapted to follow the target in the plane of sight, both these instruments as regards movement of the line of sight being constructed substantially as described in United States specification of Letters Patent No. 1252379 granted to us January 1st, 1918.

In this description the line of sight is the imaginary line passing through the sights and the target aimed at.

The angle of sight is the inclination of the line of sight to the horizontal plane.

The plane of sight is the vertical plane containing the line of sight.

The altitude plane is the plane sloping up from the observer to the target. It contains the line of sight and is inclined to the horizontal at the angle of sight.

The intersection of the plane of altitude and the plane of sight is in fact the line of sight.

The instrument A consists essentially of a fixed vertical axis, 101, mounted on a portable tripod frame 102; on the top of the vertical axis is a universal joint 103 which allows the instrument to be set rapidly in the plane of altitude. The casing of the instrument and all that it carries including the telescopic sights 105, the electric generator 106, can be turned about an axis which is at right angles to the plane of altitude by handturning the wheel 110 keyed to the shaft 107 which is held in bearings in the casing and is geared to the worm wheel 104 by the worm 108.

The shaft 107 is geared also with the armature 109 of the electric generator 106 the terminals of which are in connection with a circuit leading through resistances to the dials at the gun immediately to be described.

By the mechanical connections within the instrument it will be seen that when the wheel 110 is turned the effect is to give a slow angular motion to the casing and therefore to the telescope mounted on the top of it and simultaneously a proportionate quick rotation to the armature of the electric generator so that the voltage at the terminals of the generator is proportional to the slow angular speed of the telescopic sight about the inclined axis.

The observer operates the instrument in this way. He grasps the handle provided on the casing (see Figs. 3 and 4 below) and turns and tilts the casing about the universal joint 103 until the axis of motion is inclined substantially at right angles to the altitude plane and the target is brought into the field of view.

This operation is done in a few seconds. He then turns the handle 110 at just the speed necessary to keep the target on the vertical crosswire of the telescope. The result is that an electro-motive force is produced at the terminals which is always proportional to the angular velocity of the line of sight as it follows the target.

The current passes from the generator of the instrument A along a connecting wire to the first strip contact 11 of a resistance of which the last strip contact is 112. There are many intermediate strip contacts (2 only being shown on the diagram Fig. 2) all connected in series with the first and last contact through calculated resistances, and arranged on a drum keyed to a shaft turned by the vertical director B.

The drum is inside a casing mounted on the tripod of instrument B. The casing carries a scale 19 along which slides the contact arm 18′. This arm is moved along the scale to the height communicated to the operator. The scale 19 is divided into height of the target.

The current leaves the rheostat from the arm 18′.

It will be seen that the resistance placed in circuit with the current from the electric generator in the director depends upon the angle at which the drum stands (the angle of sight since the drum moves with the director B) and the position of the index arm 18′ along the height scale. The contact strips are so shaped that the resistance thrown in is adjusted to the time of flight corresponding to the height to which the index 18′ is set and to the angle of sight.

The result is that the current is proportional to lateral deflection required at the gun to allow for the lateral component of the motion of the target.

The current then passes to the center of a rheostat 115 from which it divides into two parallel circuits in one of which is placed the indicator dial 117 showing to the gunner the lateral deflection. The circuits reunite at 116 and this point is connected back to the generator thus completing the circuit. The object of using parallel circuits between 115 and 116 is to allow the curent to be adjusted through the indicator without altering the total resistance between these points and the resistances in the rheostat 115 are calculated accordingly.

Turning now to instrument B it is set up near instrument A, complete with the drum rheostat, called the automatic selector, on a portable tripod stand 118.

The vertical axis 119 carries at the top a horizontal axis about which the casing and all that it carries, including the telescopic sight 6 and the electric generator 121, are turned by turning the hand wheel 122.

In the diagram the instrument is turned so that the telescope is pointing up vertically.

The inside connections are similar to those of instrument A and need not be further described here beyond stating that the turning of the wheel 122 gives a slow motion about the horizontal axis to the telescope 120 and a proportional quick rotation to the armature of the electric generator 121 the result of which is to produce at the terminals an electromotive force proportional to the slow angular motion of the telescope about the horizontal axis, that is to say, proportionate to the slow angular motion of the line of sight in the vertical plane of sight.

A wheel 123 is provided for training the whole instrument about a vertical axis in order to get the target into the field of view quickly, and then keeping it there laterally.

The observer operates the instrument in this way. He grasps the handles provided on the casing and turns the instrument up toward the target at the same time turning the wheel 123 to assist in training. The target is caught in the field of view in a few seconds. He then turns the handwheel 122 at the speed necessary to keep the target on the horizontal cross wire of the telescope. The result is that the electromotive force produced at the terminals of the electric generator in the casing is proportional to the angular velocity of the line of sight in the vertical plane.

The current passes from the generator through a second rheostat on the drum the contact strips of which are indicated by dotted lines. These strips and resistances are similar to those in the first rheostat described above to adjust the current from instrument A. The index moving over these strips is insulated electrically from the index 18′ though it is mechanically connected so that the height to which it is moved applies to both rheostats. The current passing from the vertical director B therefore passes through this second rheostat and is thereby adjusted to the time of flight corresponding to the height to which the index 18′ is set and to the angle of sight.

From this second rheostat the current passes to the center of the compensating resistance 127 where it divides into two parallel circuits in one of which is placed the indicator dial 129 showing to the gunner the vertical deflection. The parallel circuits unite at point 128 and this point is connected back to the electric generator 121 to complete the circuit.

In another way of using the apparatus the dials 117 and 129 are disconnected and connection is made directly to voltmeter movements carried respectively in the training and elevation sights of the gun. The end of the needles of the voltmeter movements are formed into sighting elements. In the lateral sight for example the end of the voltmeter needle carries a fine vertical wire $a'$, and this vertical wire forms the back sight of the telescope the fore sight of which is the optical center of the front object glass combination $b'$. The gun layer then merely trains to keep the target on the vertical wire. He is unconsicious of the small lateral movement continually going on to allow for the lateral speed of the target, except if the movement is so pronounced that the wire moves toward the edge of the field of view. He can then give a slight angular motion of the telescope to bring the vertical wire within the central part of the field of view again.

In the instrument B illustrated more in detail in respect to certain parts, in Figs. 3—7, the training head of a director as described in our Letters Patent of the United States granted to us January 1st, 1918, No. 1,252,379 is replaced by a specially adapted training head 1 as illustrated. The vertical director 2 is detachably mounted on the training head 1 and an additional hinged pin 3 is provided on the vertical director. When the vertical director is attached to the training head the hinged pin 3 is turned down and engages a crank 4 on the spindle 5 co-axial with the axis of rotation of the vertical director 2. When the vertical director and its attached telescope 6 are turned about their axis the spindle 5 is thus turned through the same angle. On the spindle there are mounted two double quadrants 7, 8. These support two pieces of insulating material 9, 10, of cylindrical form. On this insulated material there are placed a number of specially shaped brass plates 11, the form of one set of strips being shown developed at Fig. 7. These plates are insulated from one another except through resistances 12 which may be conveniently carried on the opposite side to the plates as shown in Fig. 6. The last plate 11 in the series is connected by a flexible wire or circular contact ring with the terminal 13. The other terminal 14 is connected to an insulated brass rod 15 on which a sliding contact block 16 may be traversed longitudinally by the screw 17 which is turned by means of the milled head 18. The sliding block 16 has a spring pressed plunger 18′ which bears against the plates 11 on the cylinder 9 and thus makes contact through the resistances carried by the cylinder. The spring serves to connect the plunger electrically with the insulated bar 15. A pointer $16^x$ is attached to the sliding block 16; this pointer moves over the graduated scale 19 engraved with graduations representing the height of the target which is independently measured. The opposite cylindrical insulating block 10 is also provided with resistances and contact plates whose form is determined from the ballistics of the gun, these resistances being employed to give the correct deflection in the plane of altitude. A second insulated rod 21 is provided diametrically opposite the rod 15 and this rod also carries a contact piece 22 and plunger adapted to make contact with this second set of contact plates. The contact piece is traversed along the rod by a screw 23 which is rotated simultaneously with the screw 17 by the chain connection 25. The contact piece is made sufficiently wide to bridge a space between the contact plates when passing from one curve to another so that the contact 18 is never dead. At Fig. 2 the contacts of the two resistances are shown as directly and rigidly connected differing in this respect from Figs. 4 and 5 but as this Fig. 2 is a diagram this showing contributes to simplified illustration.

The operation of the apparatus is as follows;

One observer keeps the target on the cross wire of the director following the target in the plane of altitude, a second observer keeps the target on the cross wire of the director following the target in the vertical plane; the current produced by the dynamo of the plane of altitude director passes through a variable resistance on the second director and so to the indicating device, or to a device which moves one of the sighting elements of the gun. The current produced by the vertical director passes through a second variable resistance on the vertical director and then through the indicating device or to a device which moves the other sighting element of the gun.

The variable resistance in each case depends both on the instantaneous angle of inclination of the line of sight to the horizontal plane and on the height of the target which is otherwise determined, the arm for varying the resistance according to the height being set by a third observer.

Two gun layers are employed, one of whom reads the correction for deflection and the other the correction of tangent elevation required by the prevailing conditions of the moving target, or in the case in which the sights are set automatically the two gun layers simply keep the automatically adjusted lines of sight on the target.

Having now described our invention, what we claim as new and desire to secure by Letters Patent is:—

An apparatus for directing gun fire on moving targets comprising a sighting device movably mounted to follow the target, an electric generator connected to the sighting device, to be operated thereby and generating a current as a consequence of and proportional to the following movement of said sighting device, a pointer or the like, means for moving said pointer by the generated current, a variable resistance in the circuit between the electric current generator and said pointer, means whereby an operator can vary said resistance according to the height or range of the target and means for automatically varying the resistance according to the angle of sight, so that the total resistance in the circuit corresponds to the time of flight, substantially as described.

In testimony whereof we have affixed our signatures.

JOHN SIGISMUND WILSON.
WILLIAM ERNEST DALBY.